United States Patent
Yu et al.

(10) Patent No.: US 7,048,399 B2
(45) Date of Patent: May 23, 2006

(54) LIGHT GUIDE PLATE AND SURFACE LIGHT SOURCE

(75) Inventors: Tai-Cheng Yu, Tu-chen (TW); Charles Leu, Fremont, CA (US); Ga-Lane Chen, Fremont, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 242 days.

(21) Appl. No.: 10/651,928

(22) Filed: Aug. 29, 2003

(65) Prior Publication Data

US 2004/0105248 A1    Jun. 3, 2004

(30) Foreign Application Priority Data

Nov. 29, 2002    (TW) ............................... 91134735 A

(51) Int. Cl.
*F21V 8/00*    (2006.01)
(52) U.S. Cl. ........................................ 362/31; 362/558
(58) Field of Classification Search ................. 362/31, 362/555, 558, 561
See application file for complete search history.

(56) References Cited

U.S. PATENT DOCUMENTS

| | | | | |
|---|---|---|---|---|
| 5,712,694 A | * | 1/1998 | Taira et al. | 349/9 |
| 5,947,578 A | | 9/1999 | Ayres | |
| 6,415,531 B1 | * | 7/2002 | Ohtsuki et al. | 36/31 |
| 6,447,135 B1 | | 9/2002 | Wortman et al. | |
| 6,467,923 B1 | | 10/2002 | Umemoto | |
| 6,808,282 B1 | * | 10/2004 | Ishitaka | 362/610 |

* cited by examiner

*Primary Examiner*—Laura K. Tso
(74) *Attorney, Agent, or Firm*—Wei Te Chung

(57) ABSTRACT

The present invention provides a surface light source (6) using a light guide plate (2) to illuminate a liquid crystal display. The light guide plate comprises a light incident surface (21), a light-emitting surface (22) perpendicular to the light incident surface, a bottom surface (23) opposite to the light-emitting surface, and a plurality of side surfaces. An anti-reflective coating is formed on the light incident surface and the light-emitting surface. A reflective coating is formed on the bottom surface and at least one of the side surfaces. The light guide plate provides a high luminace output for the liquid crystal display.

14 Claims, 3 Drawing Sheets

LIGHT GUIDE PLATE AND SURFACE LIGHT SOURCE

BACKGROUND OF THE INVENTION

1. Field of the Invention

The present invention generally relates to a light guide plate and a surface light source employing such light guide plate.

2. Description of Related Art

Recently, liquid crystal display devices have been remarkably improved, and their market has been steadily growing because they can save installation space by virtue of their thickness, and they can also save power.

Liquid crystal displays commonly use a surface light source to provide illumination. The surface light source includes a light guide plate having a shape of a planar plate or a wedge. The light guide plate distributes light from a substantially linear source, such as a cold cathode fluorescent lamp (CCFL), to provide substantially planar illumination to the LCD.

As is well known, the light guide plate is provided for the distribution of light from the light source over an area much larger than the light source, and more particularly, substantially over an entire output surface area of the light guide plate. In operation, light beams typically enter the light guide plate along an edge surface, and may propagate between a bottom surface and the output surface toward an opposing end surface of the light guide plate by total internal reflection, or may also be output through the output surface directly. Further, the bottom surface includes structures such as dots formed on or facets cut in the bottom surface and arranged in a pattern. The light beams encountering one of these structures are diffusely or specularly reflected, so that they are emitted through the output surface.

Unfortunately, in operation, some light beams are reflected by the light incident surface and cannot enter the light guide plate, or are reflected by the light-emitting surface and cannot be output to give an illumination. Moreover, some light beams exit from the side surfaces and the bottom surface of the light guide plate, all of which results in losses of light.

In order to prevent the light beams that exit the bottom surface from being lost, it is know to provide a reflector adjacent to the bottom surface to reflect these light beams back into the light guide plate. However, once these light beams have exited the light guide plate, it is difficult for them to reenter the light guide plate. In order to prevent the light beams from exiting the side surfaces, it is common to provide reflectors supported by a frame member on the side surfaces to reflect the light beams back into the light guide plate, but this results in more parts in the display system and a weightier overall display. Another design is to secure the reflectors directly to the side surfaces using adhesive, but the reflectors are easily stripped in transportation or other operations.

SUMMARY OF THE INVENTION

An object of the present invention is to provide a surface light source which has a high illumination output for a liquid crystal display.

Another object of the present invention is to provide a surface light source which has a compact structure.

A surface light source includes a light source, a prism plate, a diffusing plate and a light guide plate disposed on the rear side of the diffusing plate. The light guide plate comprises a light incident surface, a light-emitting surface perpendicular to the light incident surface, a bottom surface opposite to the light-emitting surface, and a plurality of side surfaces. An anti-reflective coating is formed on the light incident surface and the light-emitting surface. A reflective coating is formed on the bottom surface and on at least one of the side surfaces.

The reflective coating is made from a material having high reflectivity, such as $SiO_2$ or $Ta_2O_5$. The anti-reflective coating is made by laminating layers of $SiO_2$ and layers of $Ta_2O_5$ in turn.

The light source injects light beams into the light guide plate through the light incident surface, and the light beams are reflected by the bottom surface and are emitted through the light-emitting surface. Some light beams are reflected by the side surface and back into the light guide plate, then repeat the above step. The light beams emitted from the light-emitting surface experience less loss because of the reflective coating and the anti-reflective coating, so that the surface light source provides improved illumination output for the liquid crystal display.

Other objects, advantages, and novel features of the present invention will become more apparent from the following detailed description when taken in conjunction with the accompanying drawings.

DETAILED DESCRIPTION OF THE INVENTION

Reference will now be made to the drawings to describe embodiments of the present invention in detail.

Figure 1:
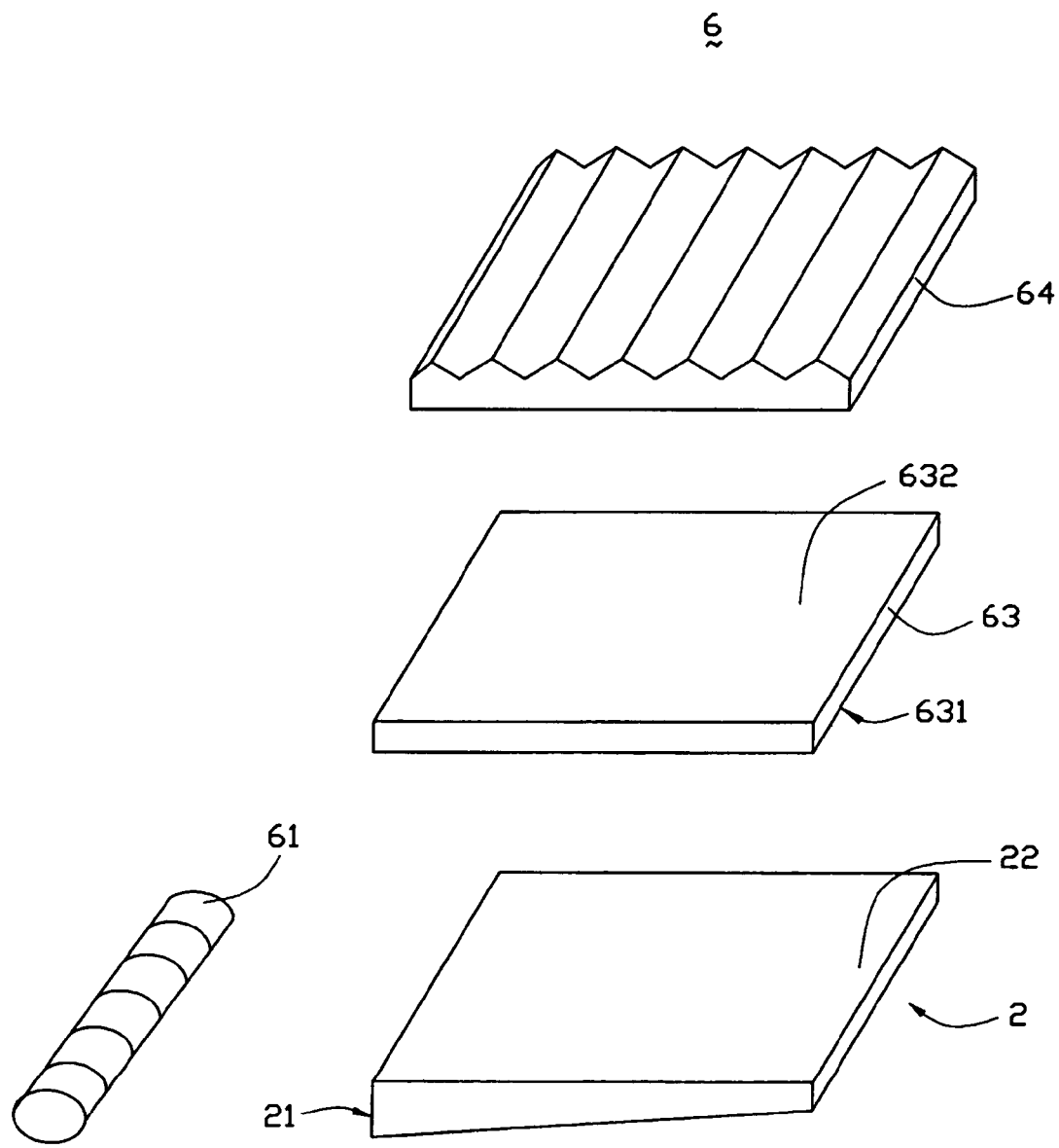
FIG. 1 is an exploded, perspective view of a surface light source of a preferred embodiment of the present invention.

FIG. 1 shows an exploded, perspective view of a surface light source 6 of a preferred embodiment in accordance with the present invention which comprises a light source 61, a light guide plate 2, a diffusing plate 63, and a prism plate 64.

The light source 61 is a linear light source, such as a cold cathode fluorescent lamp (CCFL). The diffusing plate 63 has a bottom surface 631 and a top surface 632. A plurality of glass beads (not labeled) for diffusing light emitting from the light guide plate 2 are respectively formed on the bottom surface 631 and the top surface 632. The prism plate 64 bends the light emitted from the diffusing plate 63, to a more collimated state, thereby enhancing a brightness of the surface light source 6.

Figure 2:
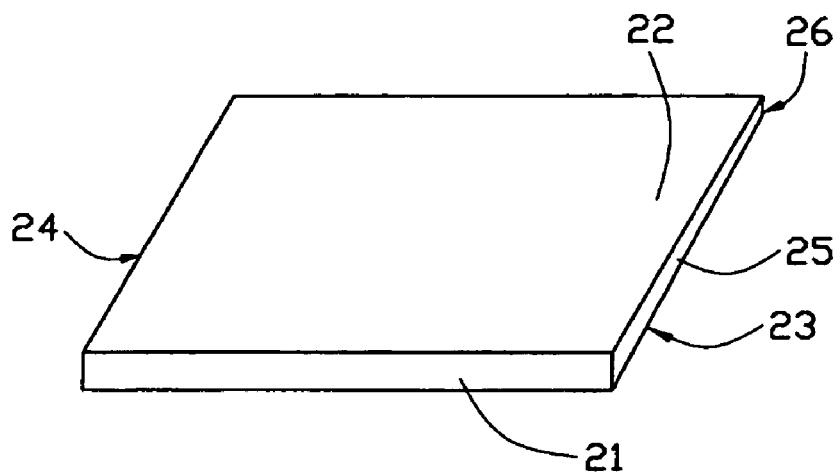
FIG. 2 is a perspective view of a light guide plate of FIG. 1.

Referring to FIG. 2, the light guide plate 2 comprises a light incident surface 21, a light-emitting surface 22 perpendicular to the light incident surface 21, a bottom surface 23 opposite to the light-emitting surface 22, and side surfaces 24, 25 and 26 perpendicular to the light-emitting surface 22. An anti-reflective coating (not labeled) is respectively formed on the light incident surface 21 and the light-emitting surface 22. A reflective coating (not labeled) is respectively formed on the bottom surface 23 and the side surfaces 24, 25 and 26.

The light guide plate 2 has a wedge shape. A thickness of the light guide plate 2 decreases from the light incident surface 21 to the side surface 26, so as to achieve a uniform illumination from the light-emitting surface 22. The light guide plate 2 is generally made from transparent materials, such as acrylic resin, polycarbonate resin or glass, preferably polymethyl methacrylate (PMMA). A refraction index thereof is preferably in the range from 1.488 to 1.492.

The reflective coating and the anti-reflective coating are formed by physical vapor deposition (PVD), chemical vapor deposition (CVD), plasma sputtering or ion beam sputtering. The reflective coating comprises a plurality of layers of materials each having a high refractive index, such as silicon dioxide ($SiO_2$) or tantalum pentoxide ($Ta_2O_5$). The reflective coating for reflecting light beams is capable of reflecting more than 97% of incoming light beams having a wavelength from 500 nm to 700 nm. In operations when light beams irradiate the bottom surface 23 and the side surfaces 24, 25 and 26, almost all the light is reflected back by the reflective coating, so that loss of the light is desirably lessened. The anti-reflective coating for transmitting light beams comprises a plurality of layers of $SiO_2$ and a plurality of layers of $Ta_2O_5$. Each layer of $SiO_2$ has a refraction index lower than of each layer of $Ta_2O_5$. The layers of $SiO_2$ and $Ta_2O_5$, are alternatively stacked one on top of another. The anti-reflective coating has a transmittance of more than 94%. The light transmits through the light incident surface 21 and the light-emitting surface 22 with small losses.

A plurality of light reflection dots (not shown) are formed on the bottom surface 23, by a screen printing technique employing pale or white ink containing a white pigment such as titanium oxide. Alternatively, a mechanical shot blasting technique, a photo-sensing method, or an integral molding technique can also be used. Other structures, such as V-shaped grooves (not shown) can be formed on the bottom surface 23 instead of using the light reflection dots. The reflection dots or the V-shaped grooves promote uniform emission of the light beams from the light-emitting surface 22.

The light source 61 is disposed adjacent to the light incident surface 21 of the light guide plate 2. The diffusing plate 63 is disposed between the light-emitting surface 22 of the light guide plate 2 and the prism plate 64.

In operation, light beams emitted from the light source 61 are radiated into the light guide plate 2 through the light incident surface 21 and are emitted through the light-emitting surface 22. The light beams emitted from the light-emitting surface 22 are radiated into the diffusing plate 63 and are diffused by the glass beads on the bottom surface 631 and the top surface 632. Then the light beams emitted from the diffusing plate 63 transmit through the prism plate 64 and provide illumination to a liquid crystal display. In the process of the operation, the light beams transmit with little loss through the light incident surface 21 and the light-emitting surface 22, which have the anti-reflective coating thereon. A part of the light beams is reflected back into the light guide plate 2 by the bottom surface 23 and the side surfaces 24, 25 and 26, which have the reflective coating thereon. These prevent loss of the light beams. A compact structure is provided.

Figure 3:
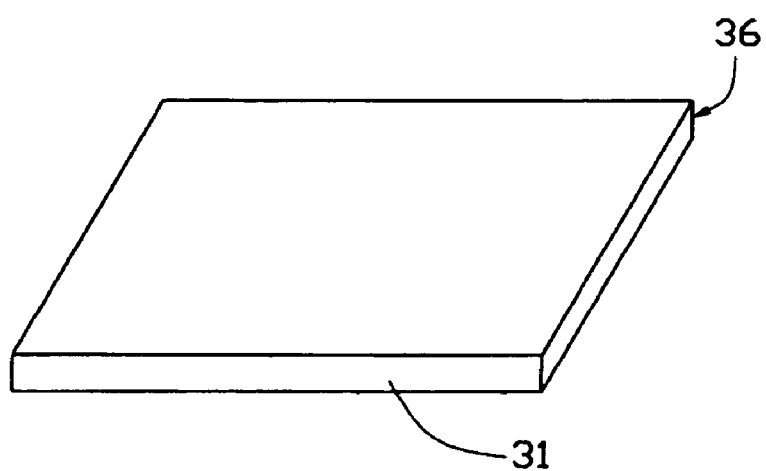
FIG. 3 is a perspective view of a second embodiment of a light guide plate used in FIG. 1.

FIG. 3 shows a second embodiment of a light guide plate 3 having the shape of a planar plate. The difference between the light guide plate 3 and the light guide plate 2 is that the light guide plate 3 includes two opposite light incident surface 31, 36.

Figure 4:
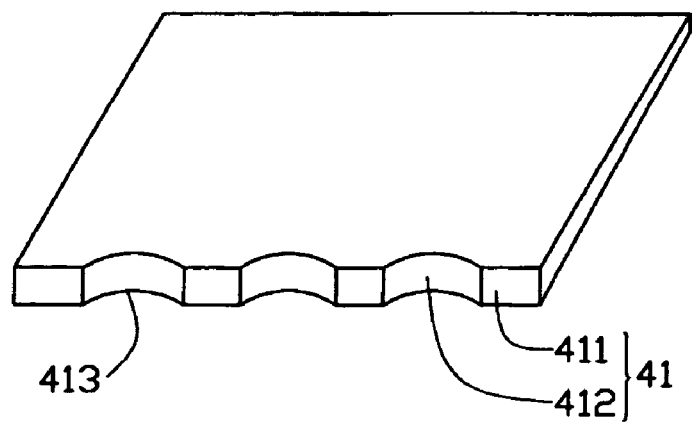
FIG. 4 is a perspective view of a third embodiment of a light guide plate used in FIG. 1.

FIG. 4 shows a third embodiment of a light guide plate 4 having a wedge shape. The light guide plate 4 has a light incident surface 41 arranged to correspond to a plurality of point light sources (not shown) such as light-emitting diodes (LEDs). A plurality of concave grooves 413 spaced a predetermined distance apart are defined in the light incident surface 41. The concave grooves 413 divide the light incident surface 41 into a plurality of plane surfaces 411 and a plurality of concave surfaces 412.

Figure 5:
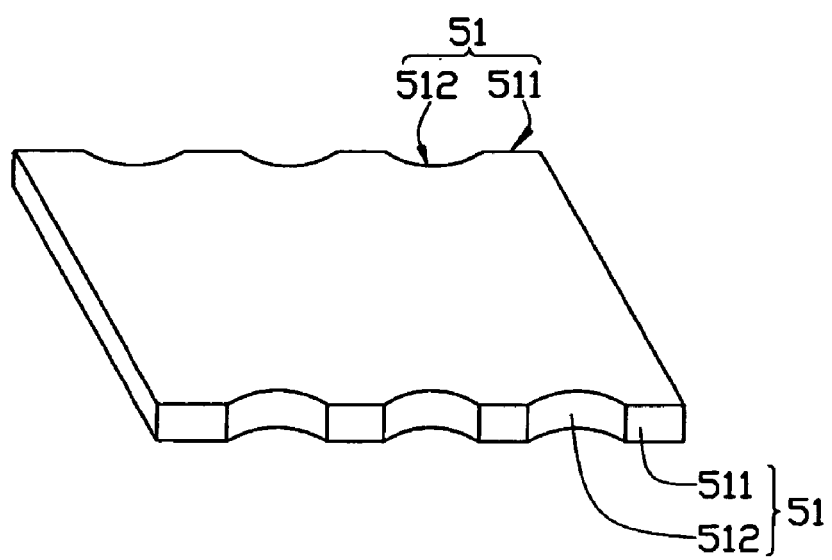
FIG. 5 is a perspective view of a fourth embodiment of a light guide plate used in FIG. 1.

FIG. 5 shows a fourth embodiment of a light guide plate 5. The light guide plate 5 is similar to the light guide plate 4 of the third embodiment, except that the light guide plate 5 includes two opposite light incident surfaces 51. Each light incident surface 51 is divided into a plurality of plane surfaces 511 and a plurality of concave surfaces 512.

The surface light source according to the present invention has the following advantages, First, the anti-reflective coating has a high transmittance, so that the light beams transmit through the light incident surface and the light-emitting surface with little loss. The reflective coating has a high reflectivity, so that few light beams will be lost through the bottom surface and side surfaces. Thus, the surface light source provides a high luminance. Second, because the reflective coating is formed on the bottom surface and the side surfaces by deposition or sputtering, no supporting frame member is need. Therefore, the surface light source has a compact structure.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A light guide plate comprising:
a light incident surface for receiving light beams;
a light-emitting surface perpendicular to the light incident surface for emitting the light beams;
a bottom surface opposite to the light-emitting surface; and
a plurality of side surfaces perpendicular to the light-emitting surface; wherein an anti-reflective coating for transmitting light beams is formed on the light incident surface and the light-emitting surface, and a reflective coating for reflecting lights beams is formed on at least one of the side surfaces.

2. The light guide plate as claimed in claim 1, wherein the reflective coating is made from $SiO_2$.

3. The light guide plate as claimed in claim 1, wherein the reflective coating is made from $Ta_2O_5$.

4. The light guide plate as claimed in claim 1, wherein the anti-reflective coating is made from $SiO_2$ and $Ta_2O_5$.

5. The light guide plate as claimed in claim 1, wherein the light incident surface comprises a plurality of plane surfaces and a plurality of concave surfaces between the plane surfaces.

6. A surface light source comprising:
a light source; and
a light guide plate located beside the light source for transmitting the light beams from the light source, comprising:
a light incident surface for receiving light beams;

a light-emitting surface perpendicular to the light incident surface for emitting the light beams;

a bottom surface opposite to the light-emitting surface; and a plurality of side surfaces perpendicular to the light-emitting surface; wherein an anti-reflective coating is formed on the light incident surface and the light-emitting surface, and a reflective coating is formed on at least one of the side surfaces.

7. The surface light source as claimed in claim 6, wherein the reflective coating is made from $SiO_2$.

8. The surface light source as claimed in claim 6, wherein the reflective coating is made from $Ta_2O_5$.

9. The surface light source as claimed in claim 6, wherein the anti-reflective coating is made from $SiO_2$ and $Ta_2O_5$.

10. The surface light source as claimed in claim 6, wherein the light incident surface further comprises a plurality of planar surfaces and a plurality of concave surfaces between the planar surfaces.

11. The surface light source as claimed in claim 6, further comprising a diffusing plate disposed on the light-emitting surface of the light guide plate.

12. The surface light source as claimed in claim 11, further comprising a prism plate disposed on the diffusing plate.

13. The surface light source as claimed in claim 6, wherein the light source is a cold cathode fluorescent lamp (CCFL).

14. A light guide plate comprising:

a light incident surface for receiving light beams;

a light-emitting surface perpendicular to the light incident surface for emitting the light beams;

a bottom surface opposite to the light-emitting surface; and a plurality of side surfaces perpendicular to the light-emitting surface; wherein an anti-reflective coating for transmitting light beams is formed on each of the light incident surface and the light-emitting surface, and a reflective coating for reflecting light beams is formed on at least one of the side surfaces other than the bottom surface.

* * * * *